United States Patent
Raman et al.

(10) Patent No.: US 9,807,017 B2
(45) Date of Patent: *Oct. 31, 2017

(54) MULTICAST TRAFFIC LOAD BALANCING OVER VIRTUAL LINK AGGREGATION

(71) Applicant: BROCADE COMMUNICATIONS SYSTEMS, INC., San Jose, CA (US)

(72) Inventors: Mythilikanth Raman, San Jose, CA (US); Chi Lung Chong, Fremont, CA (US); Vardarajan Venkatesh, Santa Clara, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,556

(22) Filed: Jan. 5, 2017

(65) Prior Publication Data
US 2017/0118124 A1 Apr. 27, 2017

Related U.S. Application Data

(63) Continuation of application No. 14/152,764, filed on Jan. 10, 2014, now Pat. No. 9,548,926.
(Continued)

(51) Int. Cl.
*G01R 31/08* (2006.01)
*H04L 12/803* (2013.01)
(Continued)

(52) U.S. Cl.
CPC ........ *H04L 47/125* (2013.01); *H04L 12/4641* (2013.01); *H04L 45/245* (2013.01); *H04L 65/4076* (2013.01)

(58) Field of Classification Search
CPC . H04L 47/125; H04L 12/4641; H04L 45/245; H04L 65/4076
See application file for complete search history.

(56) References Cited

U.S. PATENT DOCUMENTS

| 829,529 A | 8/1906 | Keathley |
| 2,854,352 A | 9/1958 | Gronemeyer |

(Continued)

FOREIGN PATENT DOCUMENTS

| CN | 1735062 | 2/2006 |
| CN | 1777149 | 5/2006 |

(Continued)

OTHER PUBLICATIONS

Eastlake, D. et al., 'RBridges: TRILL Header Options', Dec. 24, 2009, pp. 1-17, TRILL Working Group.
(Continued)

*Primary Examiner* — Gregory Sefcheck
*Assistant Examiner* — Jael Ulysse
(74) *Attorney, Agent, or Firm* — Shun Yao; Park, Vaughan, Fleming & Dowler LLP

(57) ABSTRACT

One embodiment of the present invention provides a switch. The switch comprises one or more ports, a link management module and a load balancing module. The link management module operates a port of the one or more ports of the switch in conjunction with a remote switch to form a virtual link aggregation. The load balancing module generates an index of a weight distribution vector based on address information of a multicast group associated with the virtual link aggregation. A slot of the weight distribution vector corresponds to a respective switch participating in the virtual link aggregation. In response to the index indicating a slot corresponding to the switch, the load balancing module designates the switch as primary switch for the multicast group, which is responsible for forwarding multicast data of the multicast group via the virtual link aggregation.

14 Claims, 14 Drawing Sheets

Related U.S. Application Data

(60) Provisional application No. 61/751,798, filed on Jan. 11, 2013.

(51) Int. Cl.
*H04L 29/06* (2006.01)
*H04L 12/46* (2006.01)
*H04L 12/709* (2013.01)

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,995,272 B2 | 3/2015 | Agarwal |
| 9,178,793 B1 | 11/2015 | Marlow |
| 9,350,680 B2 | 5/2016 | Thayalan |
| 9,401,818 B2 | 7/2016 | Venkatesh |
| 9,438,447 B2 | 9/2016 | Basso |
| 2001/0005527 A1 | 6/2001 | Vaeth |
| 2001/0055274 A1 | 12/2001 | Hegge |
| 2002/0019904 A1 | 2/2002 | Katz |

(56) References Cited

U.S. PATENT DOCUMENTS

| | | |
|---|---|---|
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1* | 2/2003 | Umayabashi ....... H04L 12/5601 370/468 |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1* | 8/2003 | Montalvo ............ H04L 47/125 370/389 |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1* | 12/2003 | Blanquer Gonzalez ............ H04L 47/125 370/395.4 |
| 2003/0233534 A1 | 12/2003 | Bernhard |
| 2004/0001433 A1 | 1/2004 | Gram |
| 2004/0003094 A1 | 1/2004 | See |
| 2004/0008868 A1 | 1/2004 | Bornowski |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0088668 A1* | 5/2004 | Hamlin ................ G06F 17/509 326/41 |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1* | 11/2005 | Hafid ....................... H04L 47/70 370/241 |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |

(56) References Cited

U.S. PATENT DOCUMENTS

| | | |
|---|---|---|
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1* | 5/2009 | Aboba ............... H04W 28/20 370/230 |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1* | 10/2009 | Okazaki ............ H04L 12/4604 370/236 |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0195529 A1 | 8/2010 | Liu |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0055274 A1 | 3/2011 | Scales et al. |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1* | 6/2011 | Nanda ................. H04L 12/185 370/252 |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |

(56) References Cited

U.S. PATENT DOCUMENTS

| | | |
|---|---|---|
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1* | 2/2012 | Humphries .......... H04L 12/185 370/390 |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1* | 5/2012 | Roitshtein ............ H04L 47/125 370/230 |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320749 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1* | 1/2014 | Wang ..................... H04L 45/46 709/204 |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0092738 A1* | 4/2014 | Grandhi ................ H04L 47/52 370/235 |
| 2014/0105034 A1 | 4/2014 | Sun |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0241147 A1 | 8/2014 | Rajagopalan |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Moopath |
| 2015/0009992 A1 | 1/2015 | Zhang |
| 2015/0010007 A1 | 1/2015 | Matsuhira |
| 2015/0030031 A1 | 1/2015 | Zhou |
| 2015/0110111 A1 | 4/2015 | Song |
| 2015/0110487 A1 | 4/2015 | Fenkes |
| 2015/0127618 A1 | 5/2015 | Alberti |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Ramasubramani |

(56) References Cited

U.S. PATENT DOCUMENTS

| | | | |
|---|---|---|---|
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2017/0026197 A1 | 1/2017 | Venkatesh |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'Switched Virtual Networks.' Internetworking Moves Beyond Bridges and Routers' Data Communications, Mcgraw Hill. New York, US, vol. 23, No. 12, Sep. 1, 1994 (Sep. 1, 1994), pp. 66-70,72,74, XP000462385 ISSN: 0363-6399.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Office Action dated 06/18/215, U.S. Appl. No. 13/098,490, filed May 2, 2011.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
'RBridges: Base Protocol Specification', IETF Draft, Perlman et al., Jun. 26, 2009.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated Jun. 8, 2015, U.S. Appl. No. 14/178,042, filed Feb. 11, 2014.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Oct. 2, 2014, for U.S. Appl. No. 13/092,752, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.

(56) References Cited

OTHER PUBLICATIONS

Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office Action dated May 21, 2015, U.S. Appl. No. 13/288,822, filed Nov. 3, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office action dated Apr. 30, 2015, U.S. Appl. No. 13/351,513, filed Jan. 17, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Apr. 1, 2015 U.S. Appl. No. 13/656,438 filed Oct. 19, 2012.
Office Action dated Jun. 6, 2014, U.S. Appl. No. 13/669,357, filed Nov. 5, 2012.
Office Action Dated Jun. 10, 2015, U.S. Appl. No. 13/890,150, filed May 8, 2013.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Brocade Brocade Unveils The Effortless Network, http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Kompella, Ed K. et al., 'Virtual Private LAN Service (VPLS) Using BGP for Auto-Discovery and Signaling' Jan. 2007.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Mahalingam "VXLAN: A Framework for Overlaying Virtualized Layer 2 Networks over Layer 3 Networks" Oct. 17, 2013 pp. 1-22, Sections 1, 4 and 4.1.
Mckeown, Nick et al. "OpenFlow: Enabling Innovation in Campus Networks", Mar. 14, 2008, www.openflow.org/documents/openflow-wp-latest.pdf.
Narten, T. et al., 'Problem Statement: Overlays for Network Virtualization d raft-na rten-n vo3-over l ay-problem -statement-01', Oct. 31, 2011.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,752, filed Apr. 22, 2011, from Park, Jung H., dated Jul. 18, 2013.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.

(56) References Cited

OTHER PUBLICATIONS

Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/087,239, filed Apr. 14, 2011, dated Dec. 5, 2012.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, filed Jul. 18, 2013, dated Jul. 18, 2013.
Office Action for U.S. Appl. No. 13/425,238, filed Mar. 20, 2012, dated Mar. 12, 2015.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 14/577,785, filed Dec. 19, 2014, dated Apr. 13, 2015.
Office Action for U.S. Appl. No. 13/092,887 dated Jan. 6, 2014.
Perlman, Radia et al., 'Challenges and Opportunities in the Design of TRILL: a Routed layer 2 Technology', 2009.
Rosen, E. et al., "BGP/MPLS VPNs", Mar. 1999.
S. Nadas et al., 'Virtual Router Redundancy Protocol (VRRP) Version 3 for IPv4 and IPv6', Internet Engineering Task Force, Mar. 2010.
Siamak Azodolmolky et al. "Cloud computing networking: Challenges and opportunities for innovations", IEEE Communications Magazine, vol. 51, No. 7, Jul. 1, 2013.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.

(56) References Cited

OTHER PUBLICATIONS

Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action for U.S. Appl. No. 13/288,822, dated May 26, 2017.
Office Action for U.S. Appl. No. 14/329,447, dated Jun. 8, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.

* cited by examiner

| SWITCH | MULTICAST GROUP | | |
|---|---|---|---|
| 102 | 332 | 334 | 336 |
| 104 | 342 | 344 | 346 |

312

| SWITCH | MULTICAST GROUP | | |
|---|---|---|---|
| 102 | 332 | 344 | |
| 104 | 334 | 346 | |
| 302 | 336 | 342 | |

314

MULTICAST TRAFFIC LOAD BALANCING OVER VIRTUAL LINK AGGREGATION

RELATED APPLICATIONS

This application is a continuation of application Ser. No. 14/152,764, titled "MULTICAST TRAFFIC LOAD BALANCING OVER VIRTUAL LINK AGGREGATION," by inventors Mythilikanth Raman, Chi Lung Chong, and Vardarajan Venkatesh, filed 10 Jan. 2014, which claims the benefit of U.S. Provisional Application No. 61/751,798, titled "Multicast Traffic Load Balancing Over Virtual LAG," by inventors Mythilikanth Raman, Chi Lung Chong, and Vardarajan Venkatesh, filed 11 Jan. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010, the disclosures of which are incorporated by reference herein.

BACKGROUND

Field

The present disclosure relates to network management. More specifically, the present disclosure relates to a method and system for efficiently balancing multicast traffic over virtual link aggregations (VLAGs).

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

As more time-critical applications are being implemented in data communication networks, high-availability operation is becoming progressively more important as a value proposition for network architects. It is often desirable to aggregate links to multiple switches to operate as a single logical link (referred to as a virtual link aggregation or a multi-chassis trunk) to facilitate load balancing among the multiple switches while providing redundancy to ensure that a device failure or link failure would not affect the data flow. A switch participating in a virtual link aggregation can be referred to as a partner switch of the virtual link aggregation.

Currently, such virtual link aggregations in a network have not been able to take advantage of the multicast functionalities available in a typical switch. Individual switches in a network are equipped to manage multicast traffic but are constrained while operating in conjunction with each other as partner switches of a virtual link aggregation. Consequently, an end device coupled to multiple partner switches via a virtual link aggregation typically exchanges all the multicast data with only one of the links (referred to as a primary link) in the virtual link aggregation. Even when the traffic is for different multicast groups, that multicast traffic to/from the end device only uses the primary link. As a result, multicast traffic to/from the end device becomes bottlenecked at the primary link and fails to utilize the bandwidth offered by the other links in the virtual link aggregation.

While virtual link aggregation brings many desirable features to networks, some issues remain unsolved in multicast traffic forwarding.

SUMMARY

One embodiment of the present invention provides a switch. The switch comprises one or more ports, a link management module and a load balancing module. The link management module operates a port of the one or more ports of the switch in conjunction with a remote switch to form a virtual link aggregation. The load balancing module generates an index of a weight distribution vector based on address information of a multicast group associated with the virtual link aggregation. A slot of the weight distribution vector corresponds to a respective switch participating in the virtual link aggregation. In response to the index indicating a slot corresponding to the switch, the load balancing module designates the switch as primary switch for the multicast group, which is responsible for forwarding multicast data of the multicast group via the virtual link aggregation.

In a variation on this embodiment, the number of slots of the weight distribution vector represents the bandwidth ratio or number of links in the virtual link aggregation.

In a variation on this embodiment, the slots of the weight distribution vector are ordered based on switch identifiers of switches participating in the virtual link aggregation.

In a variation on this embodiment, the load balancing module generates the index based on a hash value and the number of slots of the weight distribution vector. The load balancing module generates the hash value based on the address information of a multicast group associated with the virtual link aggregation.

In a variation on this embodiment, the load balancing module rebalances multicast groups among the switches participating in the virtual link aggregation in response to receiving an instruction indicating a change event from a remote synchronizing node.

In a further variation, the rebalancing of multicast groups is based on one or more of: a no-rebalancing mode, a partial-rebalancing mode, and a full-rebalancing mode.

In a further variation, the load balancing module initiates switching over to a new topology resulting from the change event based on the rebalancing in response to receiving an instruction indicating a switching over event from the synchronizing node.

In a variation on this embodiment, the switch and the remote switch are members of an Ethernet fabric switch. The switch and the remote switch are associated with an identifier of the Ethernet fabric switch.

One embodiment of the present invention provides a computing system. The computing system comprises a state management module and a synchronizing module. The state management module detects a change event associated with a virtual link aggregation. The synchronization module generates a first instruction indicating the change event for a switch participating in the virtual link aggregation.

In a variation on this embodiment, the synchronization module generates a second instruction for switching over to a new topology resulting from the change event for a switch participating in the virtual link aggregation in response to receiving acknowledgement for the first instruction from a respective switch participating in the virtual link aggregation.

In a further variation, the synchronization module precludes the computing system from generating an instruction indicating a second change event until receiving acknowledgement for the second instruction from a respective switch participating in the virtual link aggregation.

BRIEF DESCRIPTION OF THE FIGURES

In the figures, like reference numerals refer to the same figure elements.

DETAILED DESCRIPTION

Figure 1A:
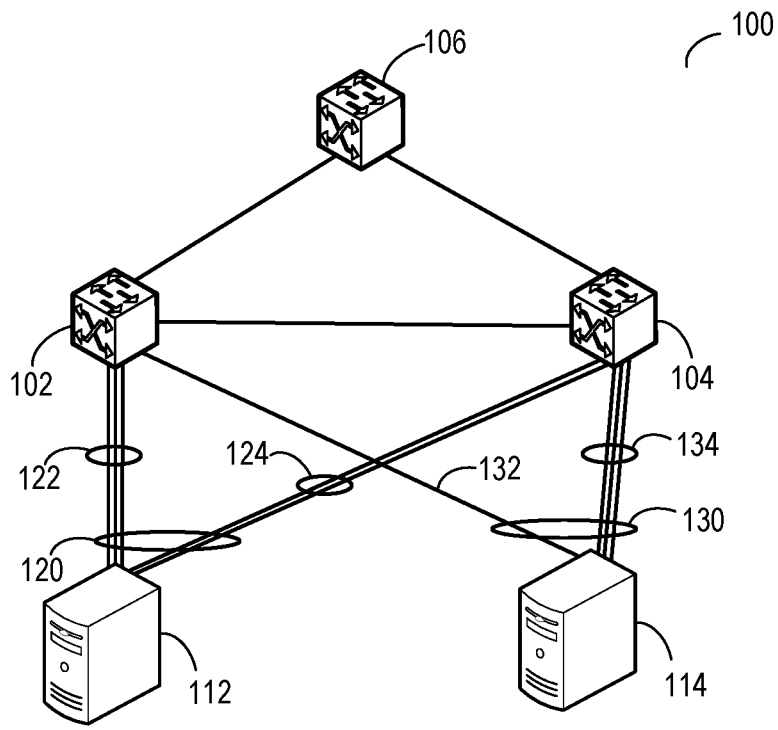
FIG. 1A illustrates exemplary virtual link aggregations with multicast load balancing support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of multicast load balancing in a virtual link aggregation is solved by fairly load balancing multicast groups across the partner switches of the virtual link aggregation. A virtual link aggregation typically dedicates one of its links (i.e., one of the ports participating in the virtual link aggregation) for forwarding multicast traffic. This link is referred to as the primary link and the switch coupled to the primary link is referred to as a primary switch. A link in a virtual link aggregation can be identified by a port associated with that link. In this disclosure, the terms "link" and "port" are used interchangeably to indicate participation in a virtual link aggregation.

With existing technologies, the virtual link aggregation dedicates the same primary link for a respective multicast group. For example, if an end device is coupled to a plurality of switches via a virtual link aggregation, the end device forwards multicast traffic belonging to a respective multicast group via the same primary link. This results in poor bandwidth utilization for virtual link aggregation and creates a congestion point for the multicast traffic on that primary link.

To solve this problem, multicast groups are distributed across the partner switches of the virtual link aggregation to provide load balancing of multicast traffic. The switches participating in a virtual link aggregation, in conjunction with each other, specify which partner switch is the primary switch for a respective multicast group. The partner switch then can further load balance across its local links in the virtual link aggregation (i.e., the partner switch's links which are in the virtual link aggregation). In some embodiments, a weight distribution vector is used to represent the bandwidth ratio of a respective link in the virtual link aggregation and determine the primary switch. As a result, the multicast load is fairly shared among the switches based on available bandwidth. In some embodiments, the weight distribution vector can also represent the number of links participating in the virtual link aggregation.

Furthermore, during any change event, when a switch or link joins or leaves the virtual link aggregation, a synchronizing node synchronizes the change. This synchronizing node can be any device capable of communicating with the switches (e.g., capable of sending/receiving messages to/from the switches) participating in the virtual link aggregation. Examples of a synchronizing node include, but are not limited to, a switch participating in the virtual link aggregation, and a physical or virtual switch, or physical or virtual computing device coupled to a respective partner switch of the virtual link aggregation via one or more links. Such synchronization avoids out-of-order packet delivery and frame duplication while providing traffic rebalancing (e.g., full, partial, or no rebalancing) during the change.

In some embodiments, the partner switches are member switches of a fabric switch. An end device can be coupled to the fabric switch via a virtual link aggregation. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to the end device.

A fabric switch runs a control plane with automatic configuration capabilities (such as the Fibre Channel control plane) over a conventional transport protocol, thereby allowing a number of switches to be inter-connected to form a single, scalable logical switch without requiring burdensome manual configuration. As a result, one can form a large-scale logical switch using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large fabric switch, which can be viewed and operated as a single switch (e.g., as a single Ethernet switch).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

Although the present disclosure is presented using examples based on the layer-3 multicast routing protocol, embodiments of the present invention are not limited to layer-3 networks. Embodiments of the present invention are relevant to any networking protocol which distributes multicast traffic. In this disclosure, the term "layer-3 network" is used in a generic sense, and can refer to any networking layer, sub-layer, or a combination of networking layers.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional switch, or any other type of network device. Additionally, an end device can be coupled to other switches or hosts further away from a network. An end device can also be an aggregation point for a number of switches to enter the network.

The term "switch identifier" refers to a group of bits that can be used to identify a switch. In a layer-2 communication, the switch identifier can be a media access control (MAC) address. If a switch is an RBridge, the switch identifier can be referred to as an "RBridge identifier." Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term and is not limited to any bit format, and can refer to any format that can identify a switch. The term "RBridge identifier" is also used in a generic sense and is not limited to any bit format, and can refer to "RBridge ID" or "RBridge nickname" or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and can refer to any standalone switch or switching fabric operating in any network layer. "Switch" should not be interpreted as limiting embodiments of the present invention to layer-2 networks. Any physical or virtual device (e.g., a virtual machine/switch operating on a computing device) that can forward traffic to an end device can be referred to as a "switch." Examples of a "switch" include, but are not limited to, a layer-2 switch, a layer-3 router, or a TRILL RBridge.

Network Architecture

FIG. 1A illustrates exemplary virtual link aggregations with multicast load balancing support, in accordance with an embodiment of the present invention. As illustrated in FIG. 1A, switches 102 and 104 in network 100 are coupled to end devices 112 and 114 via virtual link aggregations 120 and 130, respectively. Here, switches 102 and 104 are partner switches of virtual link aggregations 120 and 130. In some embodiments, network 100 is a fabric switch, and switches 102, 104, and 106 are member switches of the fabric switch. Virtual link aggregation 120 includes link aggregation 122, which includes three links, and link aggregation 124, which includes two links. Virtual link aggregation 130 includes link 132 and link aggregation 134, which includes three links. Hence, a virtual link aggregation can be formed based on link aggregations and individual links. Note that link aggregations 122, 124, and 134 can operate as trunked links between two devices.

Switches 102 and 104 maintain a number of parameters associated with virtual link aggregations 120 and 130. Such parameters include, but are not limited to, the number of switches in a virtual link aggregation, number of ports of a respective switch participating in the virtual link aggregation, and a weight distribution vector. During operation, end device 112 sends a join request for a multicast group using a multicast management protocol (e.g., an Internet Group Management Protocol (IGMP) or Multicast Listener Discovery (MLD) join) via one of the links of virtual link aggregation 120.

Suppose that end device 112 sends the join request to switch 102. In some embodiments, switch 102 shares the join request with partner switch 104. Switches 102 and 104 individually calculate a weight distribution vector. The slots (i.e., entries) of the vector represent the bandwidth ratio of a respective link (or number of links) participating in virtual link aggregation 120. Based on the vector, switches 102 and 104 determine which switch is the primary switch for the multicast group. This weight distribution vector thus allows partner switches 102 and 104 to distribute multicast groups across themselves. As a result, the traffic of different multicast groups to/from the same end device 112 can flow via different partner switches, thereby providing multicast load balancing across virtual link aggregation 120. Furthermore, for the same multicast group, different virtual link aggregations can select a different primary switch. For example, even though virtual link aggregations 120 and 130 have the same partner switches 102 and 104, for the same multicast group, switch 102 can be the primary switch in virtual link aggregations 120 while switch 104 can be the primary switch in virtual link aggregations 130.

Figure 1B:
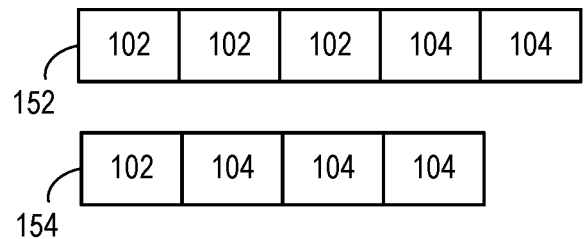
FIG. 1B illustrates exemplary weight distribution vectors based on number of links, in accordance with an embodiment of the present invention.

FIG. 1B illustrates exemplary weight distribution vectors based on number of links, in accordance with an embodiment of the present invention. In this example, weight distribution vector 152 represents the number of links in virtual link aggregation 120 and weight distribution vector 154 represents the number of links in virtual link aggregation 130. In the example in FIG. 1A, switches 102 and 104 have three and two links in virtual link aggregation 120, respectively. As a result, weight distribution vector 152 has three slots for switch 102 and two slots for switch 104. Similarly, switches 102 and 104 have one and three links in virtual link aggregation 130, respectively. As a result, weight distribution vector 154 has one slot for switch 102 and three slots for switch 104.

A slot can include a switch identifier (e.g., a MAC address) of the switch it is associated with. For example, slot 1 of weight distribution vector 152 can include the switch identifier of switch 102. In some embodiments, the switch identifiers of switches 102 and 104 determine the order of their corresponding slots in weight distribution vector 152. Suppose that the switch identifier of switch 102 has a smaller magnitude (or value) than the switch identifier of switch 104. As a result, the slots for switch 102 are the slots with lower indices in weight distribution vector 152 compared to the slots for switch 104. Similarly, the slots for switch 102 are the slots with lower indices in weight distribution vector 154 compared to the slots for switch 104.

When a switch receives a join request for a multicast group via a virtual link aggregation, the switch generates an index (e.g., an integer number) of the weight distribution vector of the virtual link aggregation for the multicast group. The index can be generated based on the group address of the multicast group. The group address can include the destination Internet Protocol (IP) address and/or the destination MAC address for the multicast group. In some embodiments, the switch generates the index based on the following calculation: hash(destination IP address, destination MAC address)%N, wherein "hash" indicates a hash function and N indicates the number of slots in the weight distribution vector.

For example, if switch 104 receives a join request for a multicast group via virtual link aggregation 130, switch 104 generates an index value for weight distribution vector 154. If the index corresponds to a slot associated with switch 104, switch 104 becomes the primary switch for the multicast group. In some embodiments, switch 104 generates the index based on the following calculation: hash(destination IP address, destination MAC address)%4. Here, 4 indicates the number of slots in weight distribution vector 154.

Figure 1C:
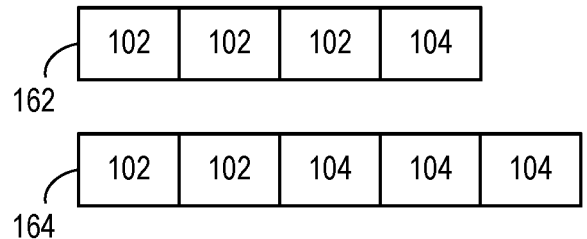
FIG. 1C illustrates exemplary weight distribution vectors based on bandwidth ratio, in accordance with an embodiment of the present invention.

FIG. 1C illustrates exemplary weight distribution vectors based on bandwidth ratio, in accordance with an embodiment of the present invention. In this example, weight distribution vector 162 represents the bandwidth ratio of links in virtual link aggregation 120 and weight distribution vector 164 represents the bandwidth ratio of links in virtual link aggregation 130. Suppose that, in the example in FIG. 1A, links coupled to switch 102 have double the bandwidth than the links coupled to switch 104. Then the bandwidth ratio for the links which are in virtual link aggregation 120 and coupled to switches 102 and 104, respectively, is 3:1. As a result, weight distribution vector 162 has three slots for switch 102 and one slot for switch 104. Similarly, the bandwidth ratio for the links which are in virtual link aggregation 130 and coupled to switches 102 and 104, respectively, is 2:3. As a result, weight distribution vector 164 has two slots for switch 102 and three slots for switch 104.

Distributed Multicast Group Balancing

The weight distribution vector generation process is independently done at a respective a partner switch of a virtual link aggregation. This allows a respective partner switch to generate the weight distribution vector in a distributed way, without requiring a central controller. As a result, the same weight distribution vector can be independently generated at a respective partner switch. Furthermore, a respective partner switch uses the same hash function for a multicast group, thereby independently generating the same index of the weight distribution vector for that multicast group. Hence, the same primary switch is selected at a respective partner switch for the multicast group.

Figure 2A:
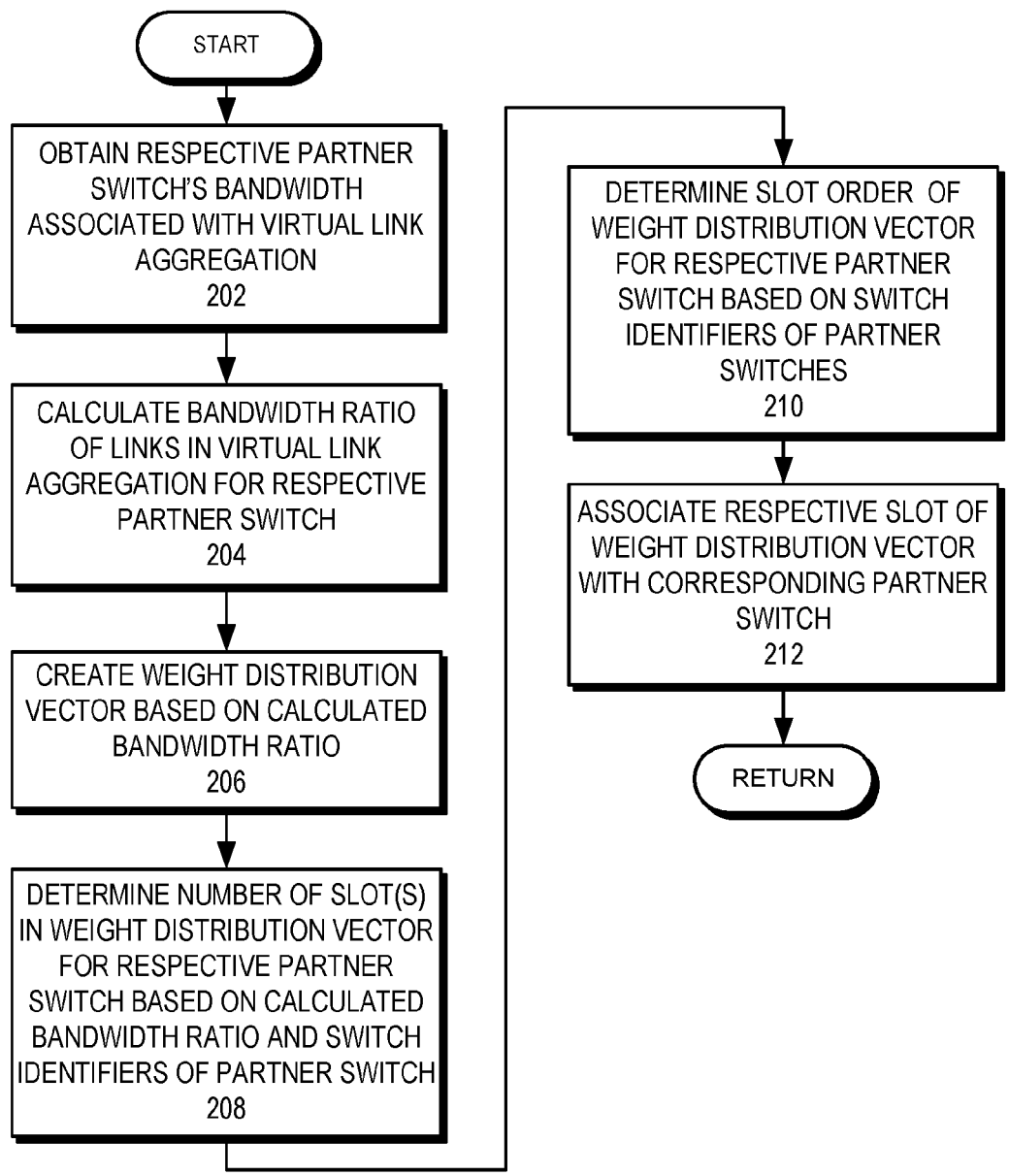
FIG. 2A presents a flowchart illustrating the process of a partner switch of a virtual link aggregation generating a weight distribution vector, in accordance with an embodiment of the present invention.

FIG. 2A presents a flowchart illustrating the process of a partner switch of a virtual link aggregation generating a weight distribution vector, in accordance with an embodiment of the present invention. During operation, the switch obtains a respective partner switch's bandwidth associated with the virtual link aggregation (operation 202). The switch then calculates the bandwidth ratio of links in virtual link aggregation for a respective partner switch (operation 204), as described in conjunction with FIG. 1C. Note that the calculation can be based on the number of ports (or links) in the virtual link aggregation, as described in conjunction with FIG. 1B. The switch creates a weight distribution vector based on the calculated bandwidth ratio (operation 206) and determines the number of slot(s) in the weight distribution vector for a respective partner switch based on the calculated bandwidth ratio (operation 208). The switch then determines the slot order of the weight distribution vector for a respective partner switch based on the switch identifiers of the switch partner switches (operation 210) and associates a respective slot of the weight distribution vector with a corresponding partner switch (operation 212).

Figure 2B:
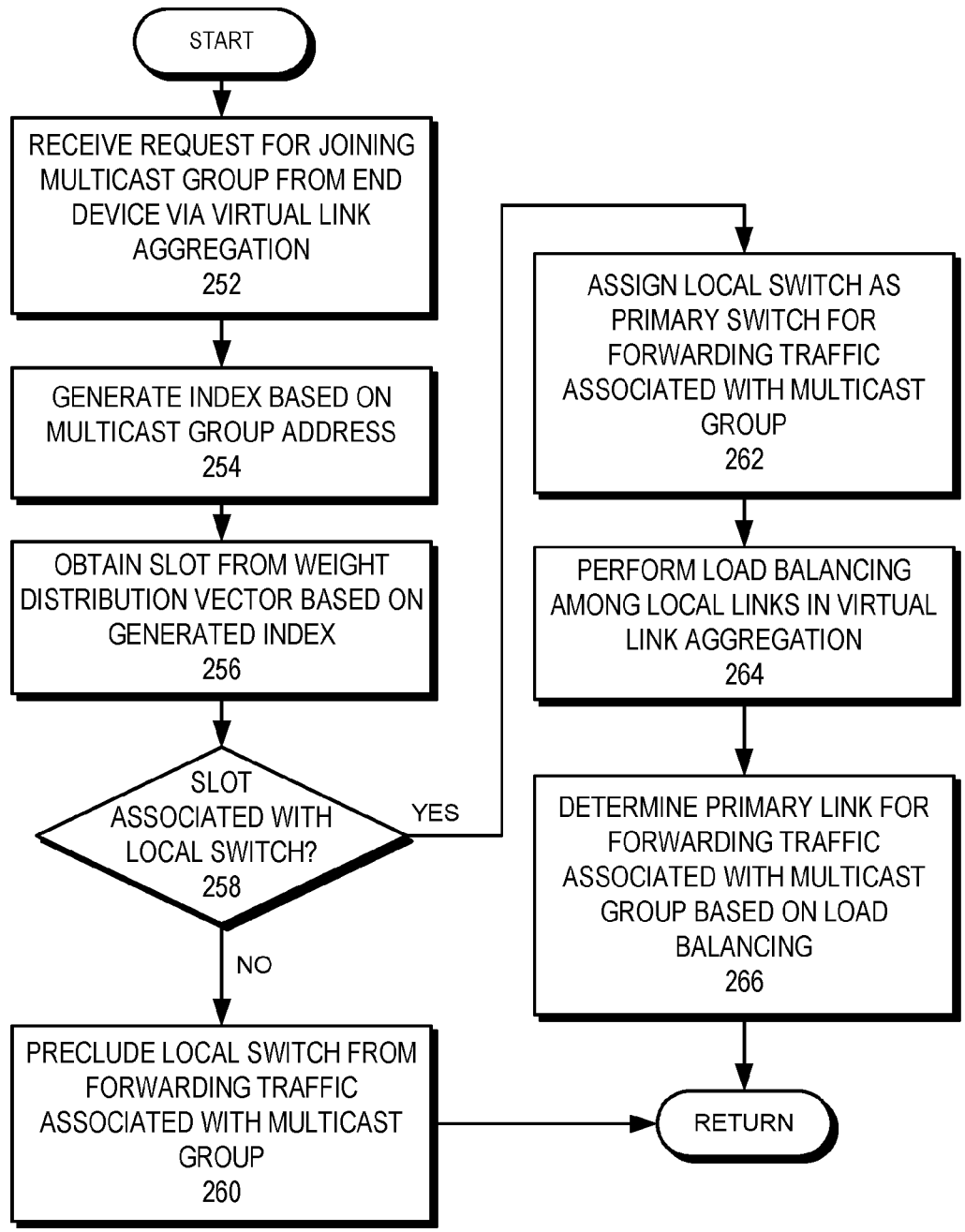
FIG. 2B presents a flowchart illustrating the process of a partner switch of a virtual link aggregation determining a primary link based on multicast load balancing, in accordance with an embodiment of the present invention.

FIG. 2B presents a flowchart illustrating the process of a partner switch of a virtual link aggregation determining a primary link based on multicast load balancing, in accordance with an embodiment of the present invention. During operation, the switch receives a request for joining a multicast group from an end device via a virtual link aggregation (operation 252) and generates an index based on the group address of the multicast group (operation 254). In some embodiments, the group address includes the destination IP address and destination MAC address; and the switch generates the index based on the following calculation: hash (destination IP address, destination MAC address)%N, wherein N indicates the number of slots in the weight distribution vector.

The switch then obtains a slot from the weight distribution vector based on the generated index (operation 256) and checks whether the obtained slot associated with the local switch (operation 258). In the example in FIG. 1B, if switch 102 generates an index of 3, then the slot corresponding to 3 is associated with switch 102. If the obtained slot is associated with the local switch, the switch assigns the local switch as the primary switch for forwarding traffic associated with the multicast group (operation 262) and performs load balancing among local links in the virtual link aggregation (operation 264). In the example in FIG. 1A, if switch 102 is the primary switch for a join request from end device 112, switch 102 performs a load balancing among the three links in link aggregation 122. The switch then determines the primary link for forwarding traffic associated with the multicast group based on the load balancing (operation 266). If the obtained slot does not correspond to the local switch, the switch precludes the local switch from forwarding traffic associated with the multicast group (operation 260).

Rebalancing Events

Network scenarios often change, requiring multicast traffic via a virtual link aggregation to be rebalanced among the links (and switches) participating in the virtual link aggregation. Such rebalancing is achieved by rebalancing the primary switch assignment based on the updated virtual link aggregation (i.e., the updated topology of the virtual link aggregation) for the corresponding multicast groups. Rebalancing of a virtual link aggregation, which can be referred to as a rebalancing event, can be triggered by a configuration event or a change event. A configuration event may occur when a static multicast group is created or deleted for the virtual link aggregation, or a request for joining or leaving a multicast group arrives at a partner switch via the virtual link aggregation. A change event may occur when a port (or a link) is added to or removed from the virtual link aggregation with existing multicast groups (e.g., is currently forwarding multicast traffic), a port participating in the virtual link aggregation becomes unavailable (e.g., due to a failure) or available (e.g., as a result of a failure recovery), and a new switch is added to the virtual link aggregation. Though the trigger sources for these change events are different, the fundamental reason of a respective change event is the same—a change event occurs when a port actively participating in a virtual link aggregation is added or removed from the existing virtual link aggregation.

Figures 3A, 3B, 3C:
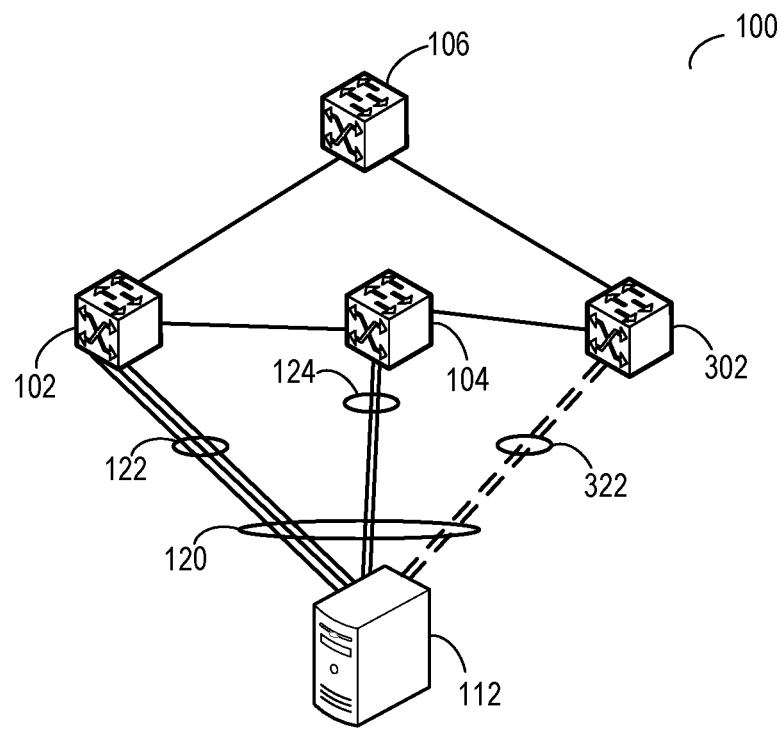
FIG. 3A illustrates an exemplary change to a virtual link aggregation with multicast load balancing support, in accordance with an embodiment of the present invention.
FIG. 3B illustrates an exemplary primary switch association of multicast groups associated with a virtual link aggregation based on no rebalancing mode, in accordance with an embodiment of the present invention.
FIG. 3C illustrates an exemplary primary switch association of multicast groups associated with a virtual link aggregation based on partial or full rebalancing mode, in accordance with an embodiment of the present invention.

FIG. 3A illustrates an exemplary change to a virtual link aggregation with multicast load balancing support, in accordance with an embodiment of the present invention. During operation, a new switch 302 joins virtual link aggregation 120 in network 100 and becomes coupled to end device 112. Switch 302 thus becomes a partner switch of switches 102 and 104 for virtual link aggregation 120. Virtual link aggregation 120 then further includes link aggregation 322 (denoted by dashed lines), which includes two links. Switch 302 maintains a number of parameters associated with virtual link aggregation 120. Such parameters include, but are not limited to, the number of switches in a virtual link aggregation, number of ports of a respective switch participating in the virtual link aggregation, and a weight distribution vector. Switch 302 can obtain these parameters from partner switches 102 and 104. These parameters can also be provided to switch 302 when switch 302 is configured to join virtual link aggregation 120.

Switch 302 joining virtual link aggregation 120 triggers a change event for virtual link aggregation 120. This change event can be considered as a network exception. The change event in virtual link aggregation 120 can change the forwarding path of existing multicast traffic to/from end device 112 via virtual link aggregation 120. As a result, the multicast groups associated with virtual link aggregation 120 (i.e., the multicast groups for which virtual link aggregation 120 carries traffic) can require rebalancing. Such rebalancing is achieved by rebalancing the primary switch assignment based on the updated topology of virtual link aggregation 120.

Any inconsistency during this change event can lead to frame loss, out-of-ordered delivery, or duplicate frames. Hence, while rebalancing the multicast traffic based on the new topology of virtual link aggregation 120, coordination with new switch 302 (and/or the new ports of switch 302 participating in link aggregation 322) is required. This coordination provides a consistent view of the primary switch assignment of the multicast groups associated with virtual link aggregation 120 to switches 102, 104, and 302, both before and after the topology changes.

In some embodiments, to provide a consistent view of virtual link aggregation 120, rebalancing of multicast groups is coordinated by a synchronizing entity, which can be referred to as a synchronizing node. A synchronizing node can be any physical or virtual device that can communicate with (e.g., send/receive messages to/from) switches 102, 104, and 302. In some embodiments, one of the switches in network 100 operates as the synchronizing node. Suppose that switch 106 operates as the synchronizing node in network 100. Upon joining network 100, switch 302 then sends a series of balancing requests to switch 106 for a respecting ports joining virtual link aggregation 120.

In some embodiments, network 100 can support three rebalancing modes: no rebalancing, partial rebalancing, and full rebalancing. The synchronizing node can select the mode based on the underlying network applications and operations. The mode can also be configured by a network administrator. The no rebalancing mode does not affect the primary switch assignment of existing multicast groups. The partial rebalancing mode affects only the primary switch assignment of existing multicast groups that should be associated with newly joined switch 302. The full rebalancing mode rebalances the primary switch assignment of all multicast groups.

FIG. 3B illustrates an exemplary primary switch association of multicast groups associated with a virtual link aggregation based on no rebalancing mode, in accordance with an embodiment of the present invention. Suppose that end device 112 has joined multicast groups 332, 334, 336, 342, 344, and 346. During operation, switch 102 is selected as the primary switch for multicast groups 332, 334, and 336, and switch 104 is selected as the primary switch for multicast groups 342, 344, and 346. If network 100 operates in no rebalancing mode, when switch 302 joins virtual link aggregation 120, the primary switch assignment of these multicast groups do not change. However, in no rebalancing mode, when a link/switch leaves virtual link aggregation 120, the weight distribution vector changes, and a new primary link among the available links is assigned to a respective multicast group associated with the left link/switch.

FIG. 3C illustrates an exemplary primary switch association of multicast groups associated with a virtual link aggregation based on partial or full rebalancing mode, in accordance with an embodiment of the present invention. If network 100 operates in partial or full rebalancing mode, when switch 302 joins virtual link aggregation 120, switches 102, 104, and 302 re-determines primary switch assignment considering newly joined switch 302. In some embodiments, this re-determination is done based on a weight distribution vector, as described in conjunction with FIGS. 1B and 1C.

Suppose that, during the redetermination, switch 102 is determined to be the primary switch for multicast groups 332 and 344, switch 104 is determined to be the primary switch for multicast groups 334 and 346, and switch 302 is determined to be the primary switch for multicast groups 336 and 342. In partial rebalancing mode, only the multicast groups that now have switch 302 as the primary switch are rebalanced and assigned a new primary switch; other multicast groups are not changed. For example, multicast groups 336 and 342 are rebalanced from switches 102 and 104, respectively, to switch 302. However, even though multicast groups 344 and 334 should have switches 102 and 104, respectively, as the primary switches based on the re-determination, switches 104 and 102, respectively, remain as the primary switch for multicast groups 344 and 334. However, in partial rebalancing mode, when a link/switch leaves virtual link aggregation 120, the weight distribution vector changes, and a new primary link among the available links is assigned to a respective multicast group associated with the left link/switch.

On the other hand, in partial rebalancing mode, all multicast groups are assigned a primary switch based on the re-determination. As a result, multicast groups 336 and 342 are rebalanced from switches 102 and 104, respectively, to switch 302, multicast group 344 is rebalanced from switch 104 to switch 102, and multicast group 334 is rebalanced from switch 102 to switch 104. Full rebalancing mode gives the most efficient distribution ratio among the links/switches virtual link aggregation 120, but at the expense of more traffic disruption. In the same way, in no rebalancing mode, when a link/switch leaves virtual link aggregation 120, all multicast groups are assigned a primary switch based on the re-determination as well. In some embodiments, switches 102, 104, and 302 maintain a respective multicast group database comprising the primary switch assignment, as described in conjunction with FIGS. 3B and 3C.

Synchronized Rebalancing

When a switch or link joins or leaves a virtual link aggregation, the rebalancing of the multicast groups is triggered. In some embodiments, if the partner switches are member switches of a fabric switch, when a switch joins or leaves the fabric switch, the rebalancing of the multicast groups is triggered as well. Since these change events can occur concurrently (e.g., multiple switches can leave or join a fabric switch or virtual link aggregation at the same time), the synchronizing node serializes the processing of these events. This serialization ensures that only one event is processed at a time and the processing of the event (e.g., a switch joining the fabric switch) is complete before the next event can start (e.g., a switch leaving the fabric switch). In addition to serializing, synchronizing node coordinates the rebalancing of multicast groups among the partner switches of a virtual link aggregation. In some embodiments, a respective virtual link aggregation can have a different synchronizing node.

Figure 4A:
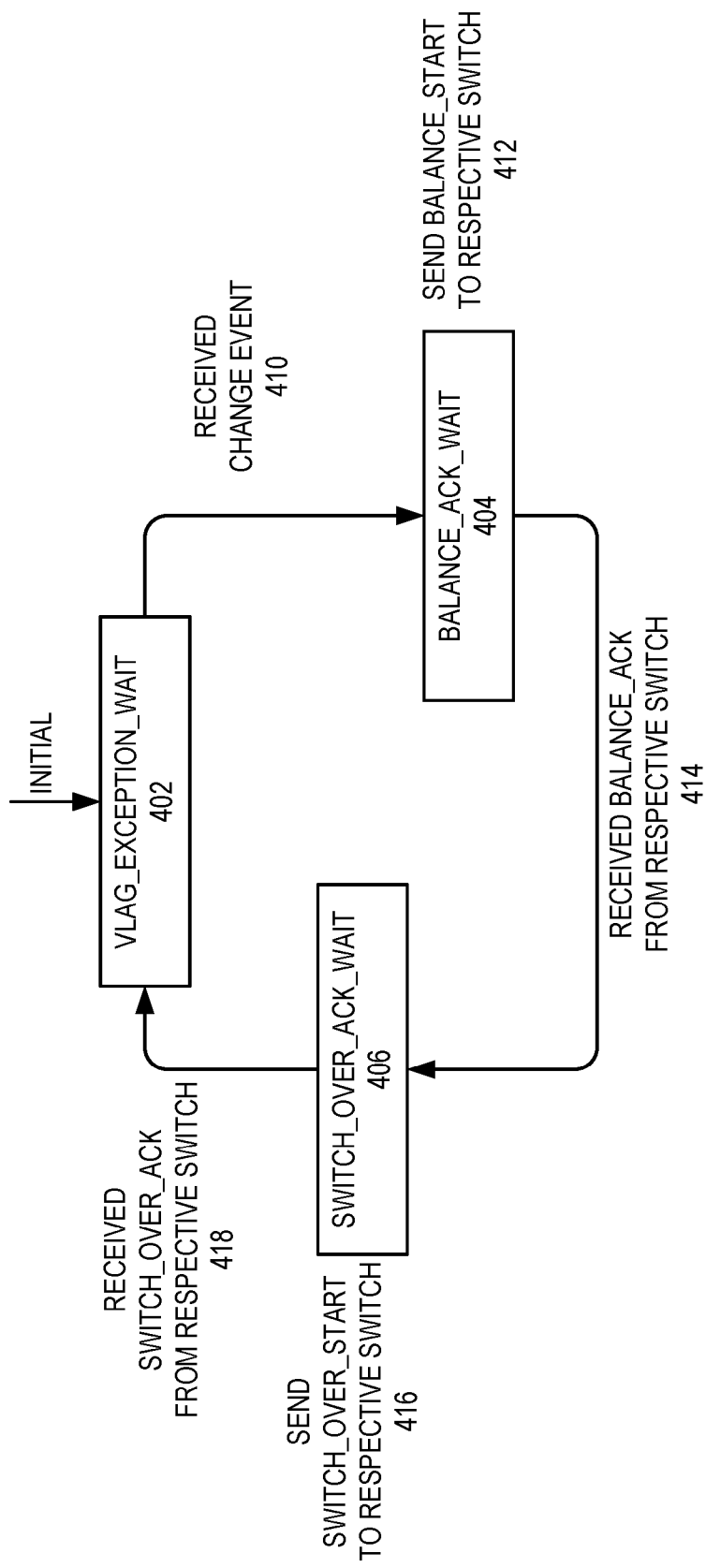
FIG. 4A illustrates an exemplary state diagram of a synchronizing node coordinating multicast load rebalancing in a virtual link aggregation, in accordance with an embodiment of the present invention.

FIG. 4A illustrates an exemplary state diagram of a synchronizing node coordinating multicast load rebalancing in a virtual link aggregation, in accordance with an embodiment of the present invention. The synchronizing node is initially in a VLAG_EXCEPTION_WAIT state (state 402). In VLAG_EXCEPTION_WAIT state, the synchronizing node waits for a change event. Upon receiving a change event (operation 410), the synchronizing node enters into a BALANCE_ACK_WAIT state (state 404). In the BALANCE_ACK_WAIT state, the synchronizing node notifies a respective switch in the network regarding the change event by sending a BALANCE_START event notification (operation 412). This BALANCE_START event requests a respective switch to synchronize its multicast group databases and the data plane (e.g., the traffic forwarding states associated with the corresponding multicast group). The synchronizing node then waits for BALANCE_ACK event notification, which indicates completion of the rebalancing, from a respective switch.

When a switch receives the BALANCE_START event notification, the switch stops processing new local join or leave requests. However, the switch completes processing of a respective join or leave request message received from other switches of the network. These messages are transient and generated before the originating switch receives the BALANCE_START event from the synchronizing node. This ensures that a respective switch has the same view of primary switch assignment for a respective multicast group. The switch then removes from local multicast group database a respective multicast group for which the switch is no longer a primary switch under the new topology (i.e., the topology created due to the change event). The switch disables forwarding of multicast data belonging to that multicast group. The switch also identifies the new primary switch. The switch can continue to forward multicast traffic without disruption for the multicast groups for which the switch remains the primary switch under the new topology.

When the synchronizing node receives a BALANCE_ACK event notification from a respective switch (operation 414), the synchronizing node enters into a SWITCH_OVER_ACK_WAIT state (state 406). In the SWITCH_OVER_ACK_WAIT state, the synchronizing node determines that primary switch assignment has converged among the switches, and accordingly, data forwarding can be enabled. Hence, the synchronizing node notifies a respective switch in the network to switch over (or cut over) to the new topology by sending a SWITCH_OVER_START event notification (operation 416). The synchronizing node then waits for SWITCH_OVER_ACK event notification from a respective switch, indicating that the corresponding switch is ready for processing the next change event. When the synchronizing node receives a SWITCH_OVER_ACK event notification from a respective switch (operation 418), the synchronizing node again enters into the VLAG_EXCEPTION_WAIT state, and is ready for processing the next change event. In this way, the synchronizing node processes the next change event only when the current change event is complete, thereby serializing the processing of the change events.

Figure 4B:
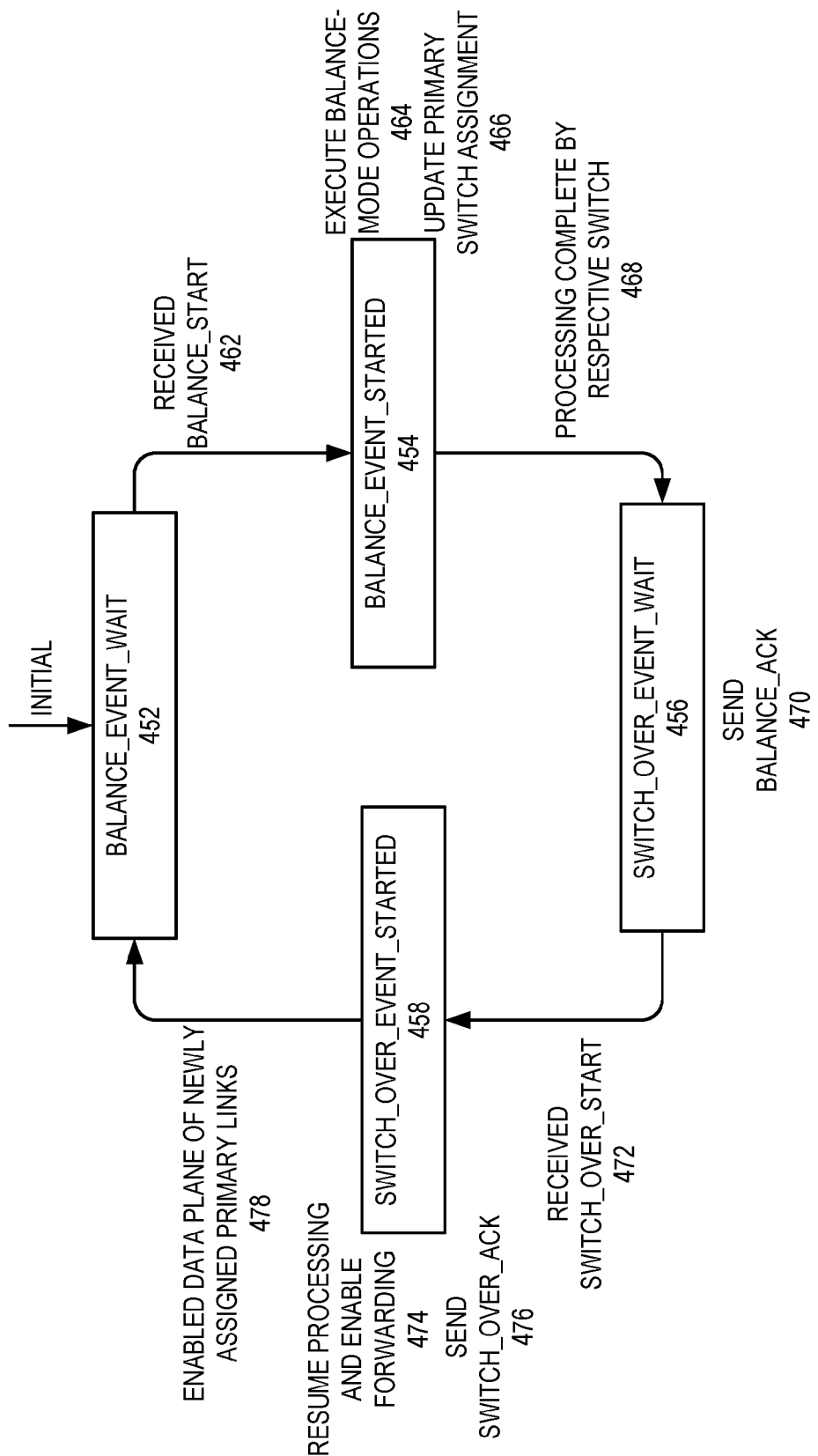
FIG. 4B illustrates an exemplary state diagram of a partner switch of a virtual link aggregation rebalancing multicast load in coordination with a synchronizing node, in accordance with an embodiment of the present invention.

FIG. 4B illustrates an exemplary state diagram of a partner switch of a virtual link aggregation rebalancing multicast load in coordination with a synchronizing node, in accordance with an embodiment of the present invention. The switch is initially in a BALANCE_EVENT_WAIT state (state 452). In the BALANCE_EVENT_WAIT state, the switch waits for a BALANCE_START event notification from the synchronizing node. Upon receiving a BALANCE_START event notification from the synchronizing node (operation 462), the switch enters into a BALANCE_EVENT_STARTED state (state 454). In the BALANCE_EVENT_STARTED state, the switch executes rebalancing operations based on the rebalancing mode (operation 464). The switch also updates the primary switch assignment (operation 466) for any pending request message (e.g., a request for joining or leaving a multicast group) and postpones processing any local request message.

In some embodiments, in the BALANCE_EVENT_STARTED state, the switch co-ordinates with other partner switches, if needed, to determine whether the processing (operation 464 and 466) is complete by a respective switch. When the processing is complete by a respective switch (operation 468), the switch sends a BALANCE_ACK event notification to the synchronizing node (operation 470) and enters into a SWITCH OVER_EVENT_WAIT state (state 456). In the SWITCH_OVER_EVENT_WAIT state, the partner switch waits for a SWITCH_OVER_START event notification, which indicates an approval for switching over to the new topology, from the synchronizing node.

When the partner switch receives a SWITCH_OVER_START event notification from the synchronizing node (operation 472), the partner switch enters into a SWITCH OVER_EVENT_STARTED state (state 458). In the SWITCH_OVER_EVENT_STARTED state, the partner switch resumes processing of local request messages and enables forwarding for multicast groups for which the partner switch is a newly assigned primary switch (operation 474). Note that the partner switch can perform local rebalancing of multicast groups based on the post-switching-over topology of the virtual link aggregation to determine whether the switch is a newly assigned primary switch for a multicast group. In the example of FIG. 3A, the post-switching-over topology for virtual link aggregation 120 includes switches 102, 104, and 302, and the pre-switching-over topology for virtual link aggregation 120 includes switches 102 and 104.

The partner switch then sends a SWITCH_OVER_ACK event notification to the synchronizing node (operation 476). SWITCH_OVER_ACK event indicates that the member has completed switching over to the post-switching-over topology for the corresponding virtual link aggregation. Upon sending the SWITCH_OVER_ACK event notification to the synchronizing node, the partner switch enables the data plane of newly assigned primary links (operation 478) and again enters into the BALANCE_EVENT_WAIT state, and is ready for processing the next change. In this way, the synchronizing node coordinates rebalancing among the switches, thereby facilitating a distributed, serialized, and synchronized rebalancing process in response to change events.

Rebalancing for a Join Event

When a switch or link joins a virtual link aggregation, the rebalancing of the multicast groups is triggered. The rebalancing process of a partner switch of a virtual link aggregation for a join event based on a rebalancing mode occurs in the BALANCE_EVENT_STARTED state of the partner switch. After the rebalancing, the switching over process of the partner switch occurs in the SWITCH_OVER_EVENT_STARTED state of the partner switch.

Figure 5A:
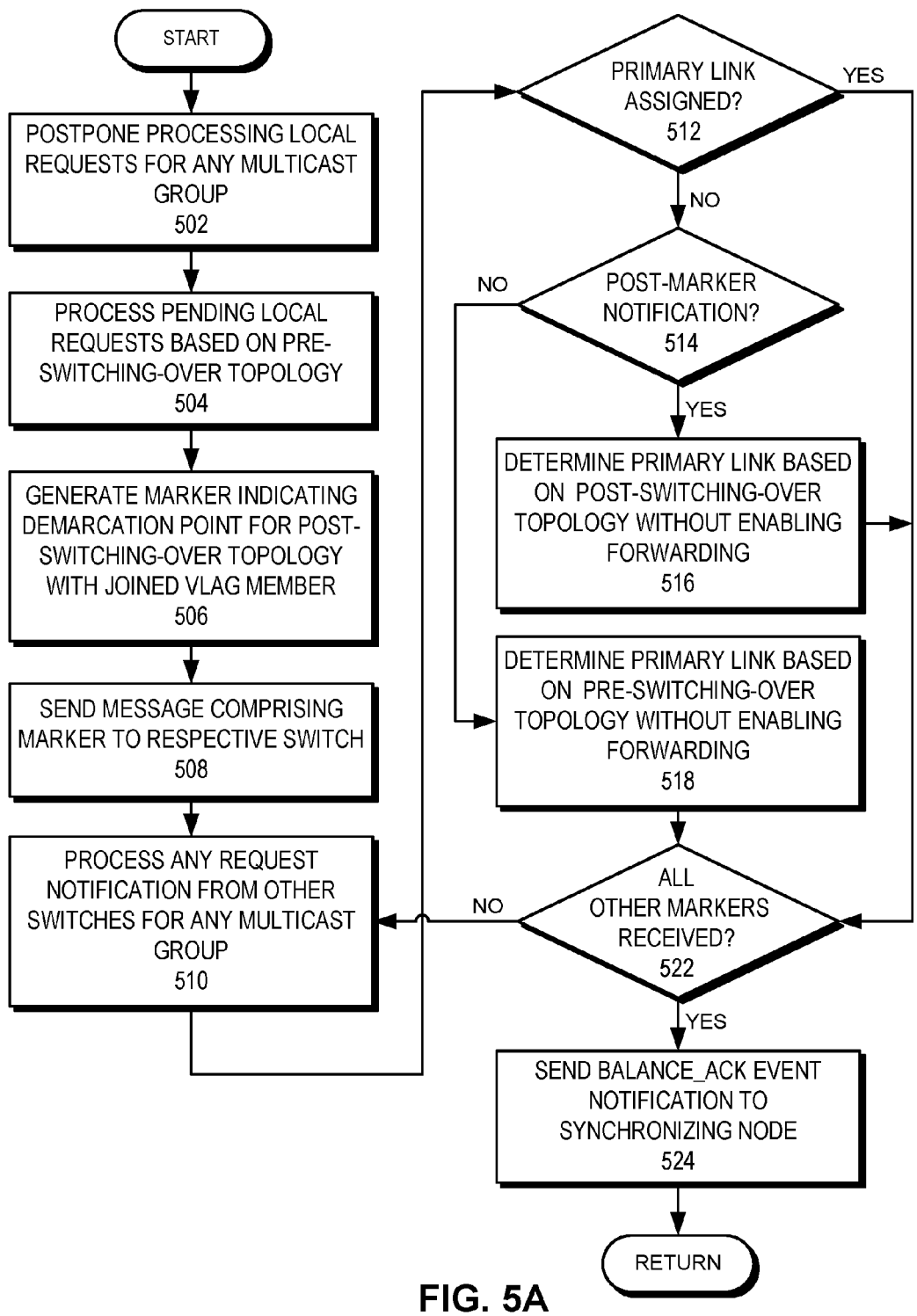
FIG. 5A presents a flowchart illustrating the rebalancing process of a partner switch of a virtual link aggregation for a join event based on no rebalancing, in accordance with an embodiment of the present invention.

FIG. 5A presents a flowchart illustrating the rebalancing process of a partner switch of a virtual link aggregation for a join event based on no rebalancing, in accordance with an embodiment of the present invention. During operation, the switch postpones processing local requests (i.e., requests for joining or leaving a multicast group locally received via an edge port) for any multicast group (operation 502). An edge port sends/receives data frames to/from an end device. However, the switch continues to process the pending local requests based on pre-switching-over topology of the virtual link aggregation (operation 504). The switch then generates a marker indicating a demarcation point for the post-switching-over topology with the newly joined member (e.g., a partner switch/link) of the virtual link aggregation (operation 506). In some embodiments, the marker is a timestamp indicating that the primary switch assignment for any join request received after this timestamp should be done based on the post-switching-over topology of the virtual link aggregation.

The switch sends a message comprising the marker to a respective switch (operation 508). In some embodiments, the switch sends the marker to itself as well, ensuring the correct marker is used as the demarcation. The switch processes any request notification (e.g., a request for joining or leaving) from other switches for any multicast group (operation 510). The switch then checks whether a primary link has already been assigned for the multicast group (operation 512). If not, the switch checks whether the request notification is a post-marker notification (i.e., whether the request notification has been received after the demarcation point indicated by the marker) (operation 514).

If the request notification is a post-marker notification, the switch determines a primary link for the multicast group based on the post-switching-over topology without enabling forwarding (operation 516), as described in conjunction with FIG. 2B. If the request notification is a not post-marker notification, the switch determines a primary link for the multicast group based on the pre-switching-over topology without enabling forwarding (operation 518). If a primary link has not been assigned for the multicast group (operation 512) or the switch has determined a primary link (operation 516 or 518), the switch checks whether all other markers have been received (operation 522). Receiving all other markers from all other switches indicates that the rebalancing process of all other switches have been complete. If the switch has not received all other markers, the switch continues to process request notifications from other switches for any multicast group (operation 510). Otherwise, the switch sends a BALANCE_ACK event notification to the corresponding synchronizing node (operation 524), as described in conjunction with FIG. 4B.

Figure 5B:
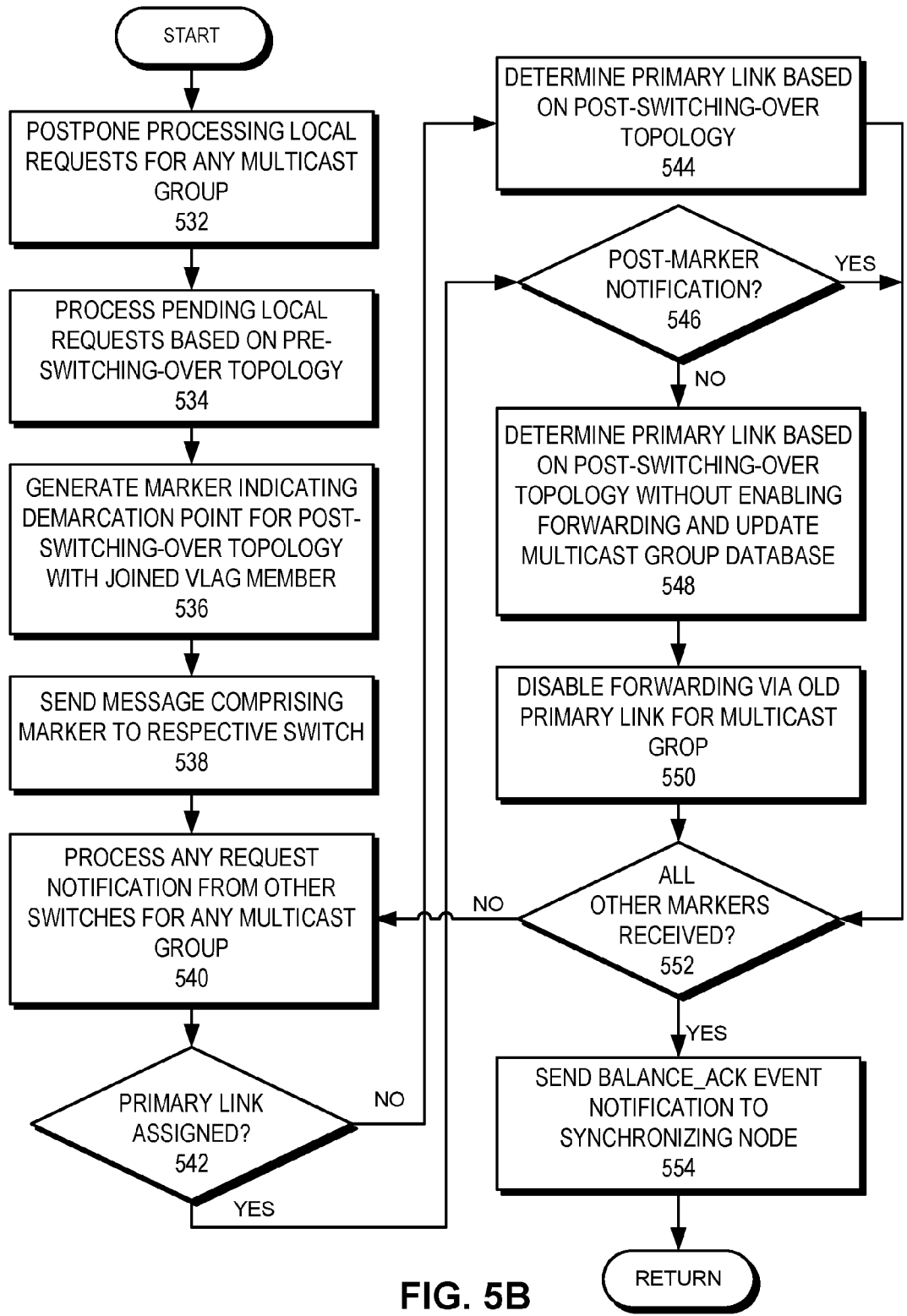
FIG. 5B presents a flowchart illustrating the rebalancing process of a partner switch of a virtual link aggregation for a join event based on partial rebalancing, in accordance with an embodiment of the present invention.

FIG. 5B presents a flowchart illustrating the rebalancing process of a partner switch of a virtual link aggregation for a join event based on partial rebalancing, in accordance with an embodiment of the present invention. During operation, the switch postpones processing local requests for any multicast group (operation 532) and processes the pending local requests based on pre-switching-over topology of the virtual link aggregation (operation 534). The switch then generates a marker indicating a demarcation point for the post-switching-over topology with the newly joined member (e.g., a partner switch/link) of the virtual link aggregation (operation 536). The switch sends a message comprising the marker to a respective switch (operation 538). In some embodiments, the switch sends the marker to itself as well.

The switch processes any request notification from other switches for any multicast group (operation 540). The switch then checks whether a primary link has already been assigned for the multicast group (operation 542). If not, the switch determines a primary link for the multicast group based on the post-switching-over topology (operation 544). If a primary link has been assigned for the multicast group, the switch checks whether the request notification is a post-marker notification (operation 544). If the request notification is a post-marker notification, the switch determines a primary link for the multicast group based on the post-switching-over topology, as described in conjunction with FIG. 2B, without enabling forwarding and updates the multicast group database (operation 548).

The switch then disables forwarding via the old primary link for the multicast group (operation 550). In some embodiments the multicast group database comprises the multicast groups for which the switch is a primary link. If the switch has determined a primary link(operation 544) or the switch has disabled forwarding via the old primary link (operation 550), the switch checks whether all other markers have been received (operation 552). If the switch has not received all other markers, the switch continues to process request notifications from other switches for any multicast group (operation 540). Otherwise, the switch sends a BALANCE_ACK event notification to the corresponding synchronizing node (operation 554), as described in conjunction with FIG. 4B.

Figure 5C:
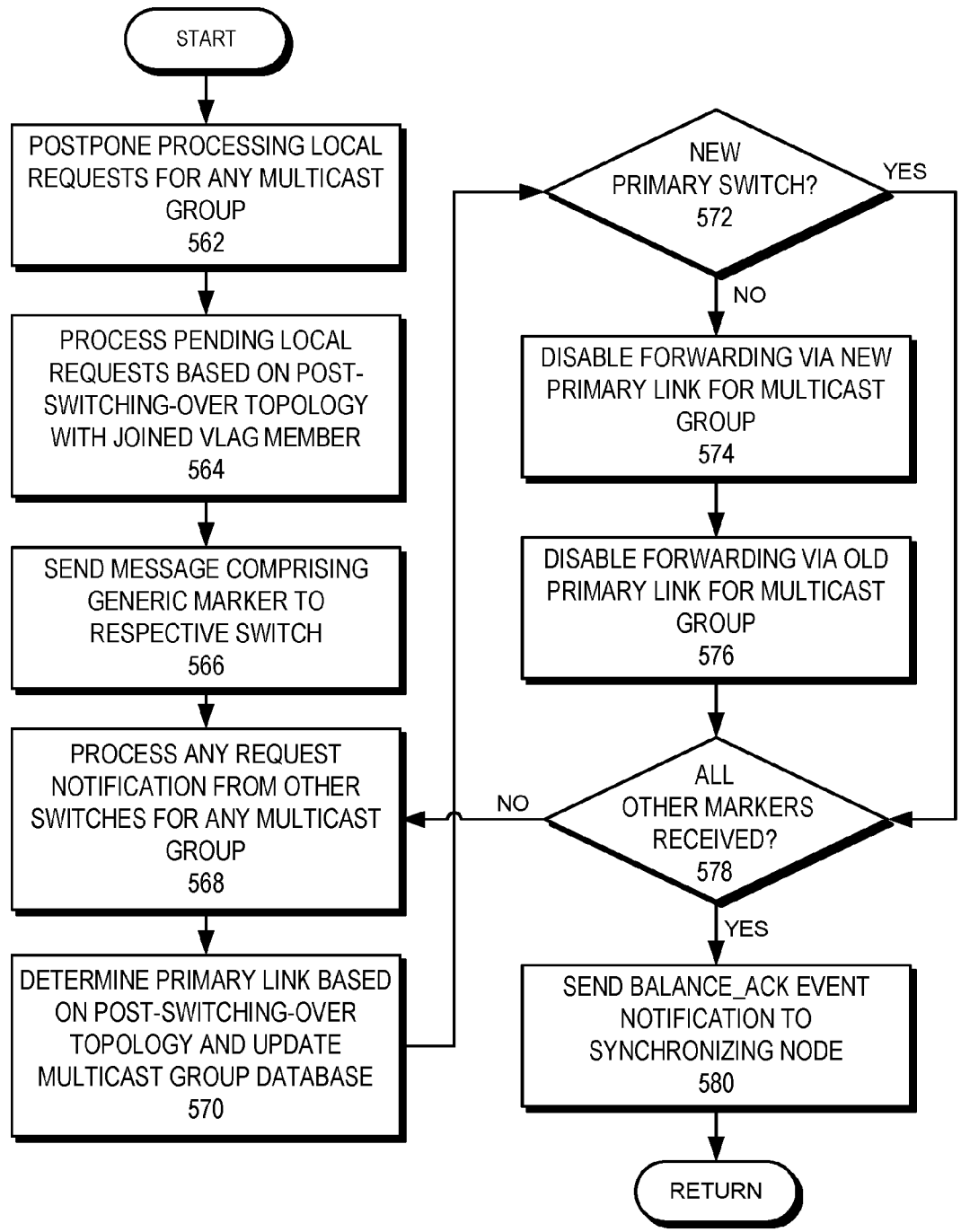
FIG. 5C presents a flowchart illustrating the rebalancing process of a partner switch of a virtual link aggregation for a join event based on full rebalancing, in accordance with an embodiment of the present invention.

FIG. 5C presents a flowchart illustrating the rebalancing process of a partner switch of a virtual link aggregation for a join event based on full rebalancing, in accordance with an embodiment of the present invention. During operation, the switch postpones processing local requests for any multicast group (operation 562) and continues to process the pending local requests based on post-switching-over topology with the newly joined member (e.g., a partner switch/link) of the virtual link aggregation (operation 564). The switch sends a message comprising a generic marker to a respective switch (operation 566). In some embodiments, the switch sends the marker to itself as well. Since the primary switch is determined for all multicast groups based on post-switching-over topology in full rebalancing mode, the marker is not used to determine whether the pre- or post-switching-over topology should be used for determining the primary switch and link. Here, the marker is generated to make the rebalancing process generic for all rebalancing modes.

The switch processes any request notification from other switches for any multicast group (operation 568), and determines a primary link for the multicast group based on the post-switching-over topology, as described in conjunction with FIG. 2B, and updates the multicast group database (operation 570). The switch then checks whether the determined primary link is via a new primary switch (operation 572). If the determined primary link is via a new primary switch, the switch disables forwarding via the new primary link (operation 574) and the old primary link (operation 576) for the multicast group. If determined primary link is not via a new primary switch (operation 572) or the forwarding via the old primary link has been disabled (operation 576), the switch checks whether all other markers have been received (operation 578). If the switch has not received all other markers, the switch continues to process request notifications from other switches for any multicast group (operation 568). Otherwise, the switch sends a BALANCE_ACK event notification to the corresponding synchronizing node (operation 580), as described in conjunction with FIG. 4B.

Figure 5D:
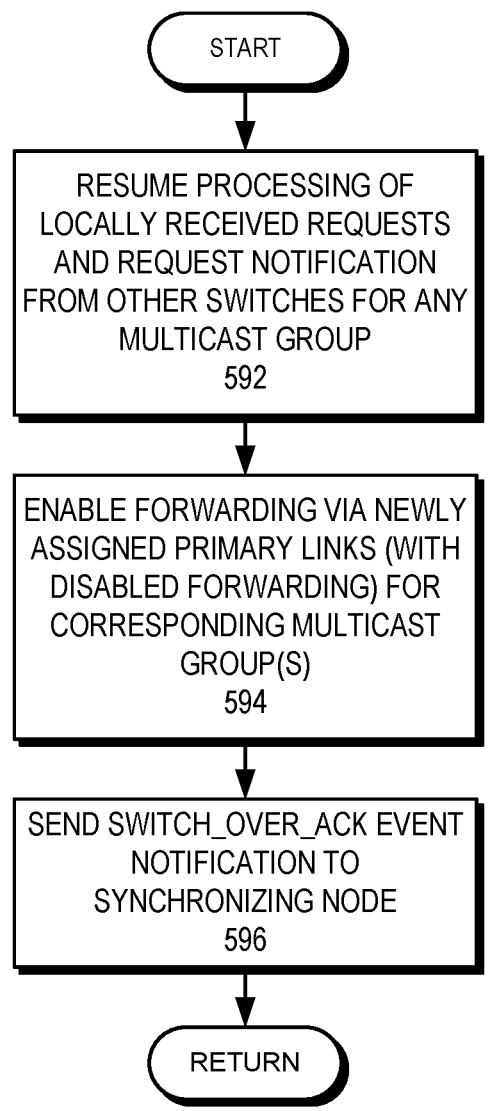
FIG. 5D presents a flowchart illustrating the switching over process of a partner switch of a virtual link aggregation for a join event, in accordance with an embodiment of the present invention.

FIG. 5D presents a flowchart illustrating the switching over process of a partner switch of a virtual link aggregation for a join event, in accordance with an embodiment of the present invention. During operation, the switch resumes processing of locally received requests (e.g., requests received via edge ports) and request notification from other switches for any multicast group (operation 592). The switch enables forwarding via newly assigned primary links, which can have a disabled forwarding during the rebalancing process, for the corresponding multicast group(s) (operation 594). The switch then sends a SWITCH_OVER_ACK event notification to the synchronizing node (operation 596), as described in conjunction with FIG. 4B.

Rebalancing for a Leave Event

When a switch or link leaves a virtual link aggregation, the rebalancing of the multicast groups is triggered. The rebalancing process of a partner switch of a virtual link aggregation for a leave event based on a rebalancing mode occurs in the BALANCE_EVENT_STARTED state of the partner switch. This rebalancing process is the same for no and partial rebalancing mode. After the rebalancing, the switching over process of the partner switch occurs in the SWITCH_OVER_EVENT_STARTED state of the partner switch.

Figure 6A:
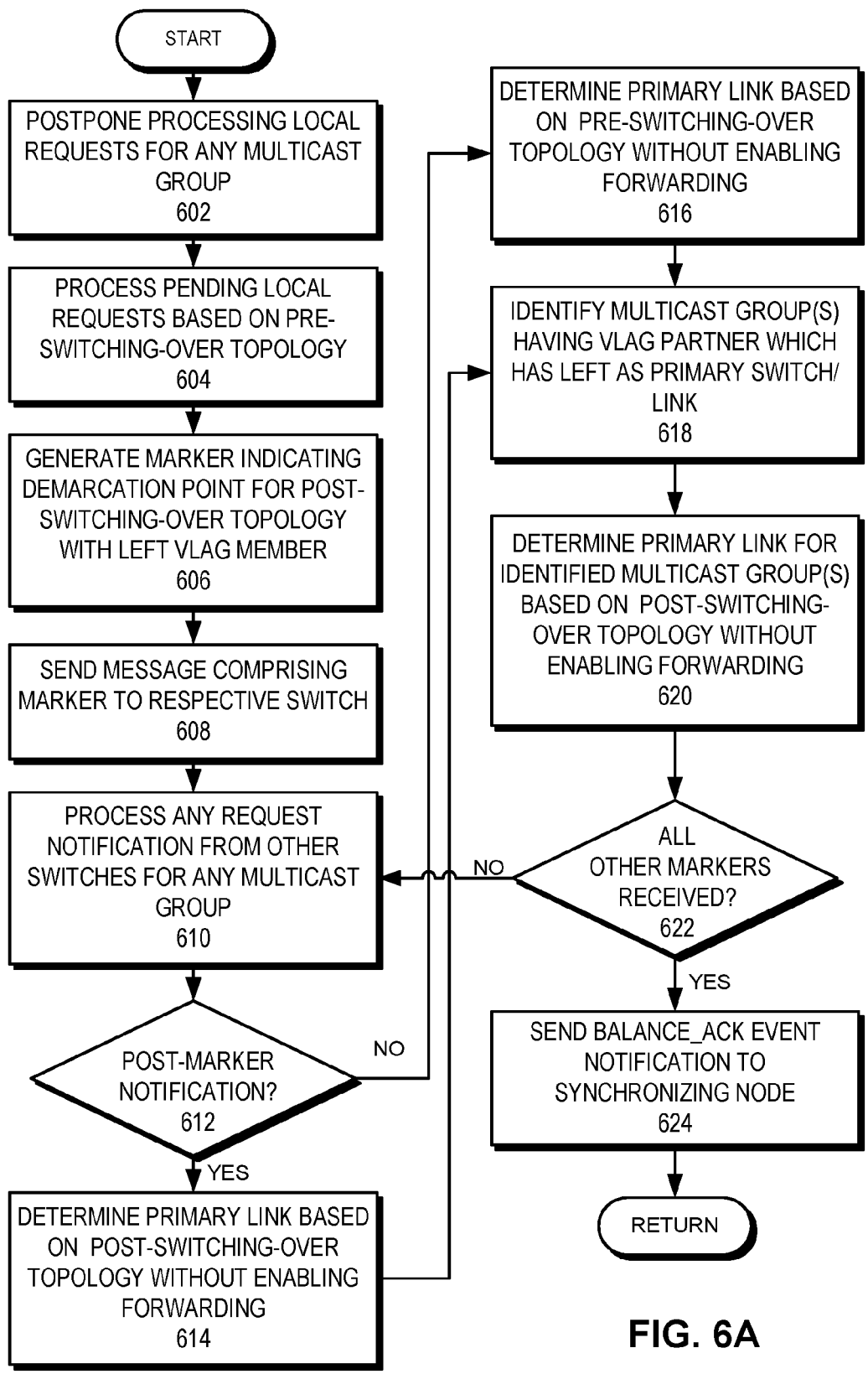
FIG. 6A presents a flowchart illustrating the rebalancing process of a partner switch of a virtual link aggregation for a leave event based on no or partial rebalancing, in accordance with an embodiment of the present invention.

FIG. 6A presents a flowchart illustrating the rebalancing process of a partner switch of a virtual link aggregation for a leave event based on no or partial rebalancing, in accordance with an embodiment of the present invention. During operation, the switch postpones processing local requests for any multicast group (operation 602) and processes the pending local requests based on pre-switching-over topology of the virtual link aggregation (operation 604). The switch then generates a marker indicating a demarcation point for the post-switching-over topology with the newly left member (e.g., a partner switch/link) of the virtual link aggregation (operation 606). The switch sends a message comprising the marker to a respective switch (operation 608). In some embodiments, the switch sends the marker to itself as well. The switch processes any request notification (e.g., a request for joining or leaving) from other switches for any multicast group (operation 610).

The switch then checks whether the request notification is a post-marker notification (operation 612). If the request notification is a post-marker notification, the switch determines a primary link for the multicast group based on the post-switching-over topology without enabling forwarding (operation 614), as described in conjunction with FIG. 2B. If the request notification is a not post-marker notification, the switch determines a primary link for the multicast group based on the pre-switching-over topology without enabling forwarding (operation 616). After determining a primary link (operation 614 or 616), the switch identifies the multicast group(s) having the virtual link aggregation member which has been left as the primary switch/link (operation 618).

The switch then determines a primary link for the identified multicast group(s) based on the post-switching-over topology without enabling forwarding (operation 620). The switch checks whether all other markers have been received (operation 622). Receiving all other markers from all other switches indicates that the rebalancing process of all other switches have been complete. If the switch has not received all other markers, the switch continues to process request notifications from other switches for any multicast group (operation 610). Otherwise, the switch sends a BALANCE_ACK event notification to the corresponding synchronizing node (operation 624), as described in conjunction with FIG. 4B.

Figure 6B:
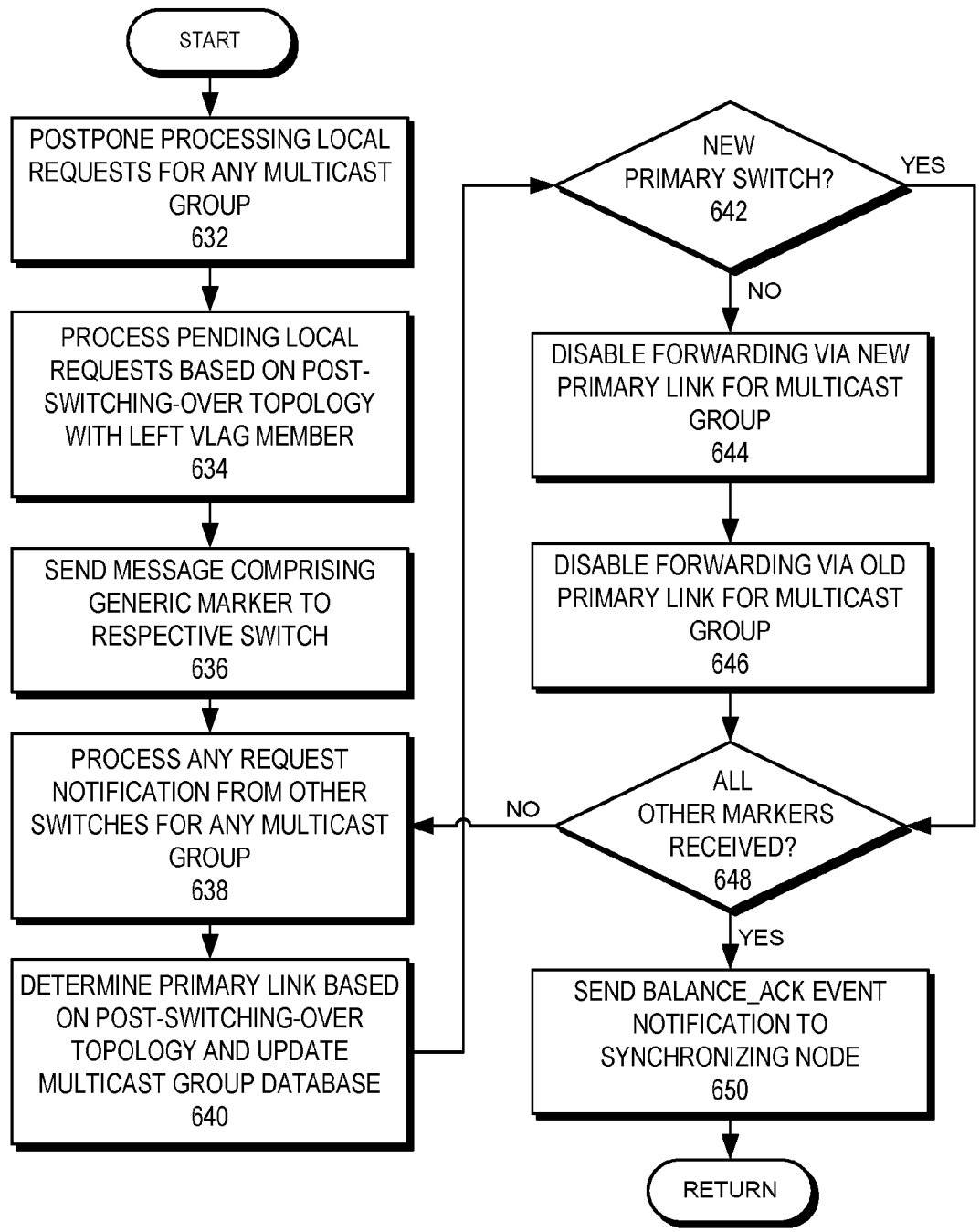
FIG. 6B presents a flowchart illustrating the rebalancing process of a partner switch of a virtual link aggregation for a leave event based on full rebalancing, in accordance with an embodiment of the present invention.

FIG. 6B presents a flowchart illustrating the rebalancing process of a partner switch of a virtual link aggregation for a leave event based on full rebalancing, in accordance with an embodiment of the present invention. During operation, the switch postpones processing local requests for any multicast group (operation 632) and processes the pending local requests based on post-switching-over topology with the newly left member (e.g., a partner switch/link) of the virtual link aggregation (operation 634). The switch sends a message comprising a generic marker to a respective switch (operation 636). In some embodiments, the switch sends the marker to itself as well. Since the primary switch is determined for all multicast groups based on post-switching-over topology in full rebalancing mode, the marker is not used to determine whether the pre- or post-switching-over topology should be used for determining the primary switch and link. Here, the marker is generated to make the rebalancing process generic for all rebalancing modes.

The switch processes any request notification from other switches for any multicast group (operation 638), and determines a primary link for the multicast group based on the post-switching-over topology, as described in conjunction with FIG. 2B, and updates the multicast group database (operation 640). The switch then checks whether the determined primary link is via a new primary switch (operation 642). If the determined primary link is via a new primary switch, the switch disables forwarding via the new primary link (operation 644) and the old primary link (operation 646) for the multicast group. If determined primary link is not via a new primary switch (operation 642) or the forwarding via the old primary link has been disabled (operation 646), the switch checks whether all other markers have been received (operation 648). If the switch has not received all other markers, the switch continues to process any request notification from other switches for any multicast group (operation 638). Otherwise, the switch sends a BALANCE_ACK event notification to the corresponding synchronizing node (operation 650), as described in conjunction with FIG. 4B.

Figure 6C:
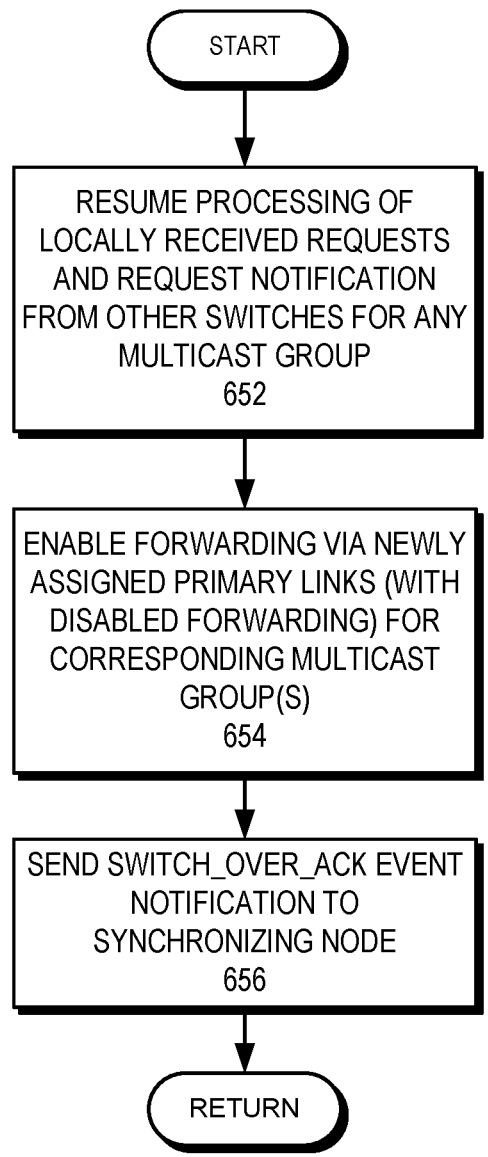
FIG. 6C presents a flowchart illustrating the switching over process of a partner switch of a virtual link aggregation for a leave event, in accordance with an embodiment of the present invention.

FIG. 6C presents a flowchart illustrating the switching over process of a partner switch of a virtual link aggregation for a leave event, in accordance with an embodiment of the present invention. During operation, the switch resumes processing of locally received requests (e.g., requests received via edge ports) and request notification from other switches for any multicast group (operation 652). The switch enables forwarding via newly assigned primary links, which can have a disabled forwarding during the rebalancing process, for the corresponding multicast group(s) (operation 654). The switch then sends a SWITCH_OVER_ACK event notification to the synchronizing node (operation 656), as described in conjunction with FIG. 4B.

Exemplary Systems

Figure 7:
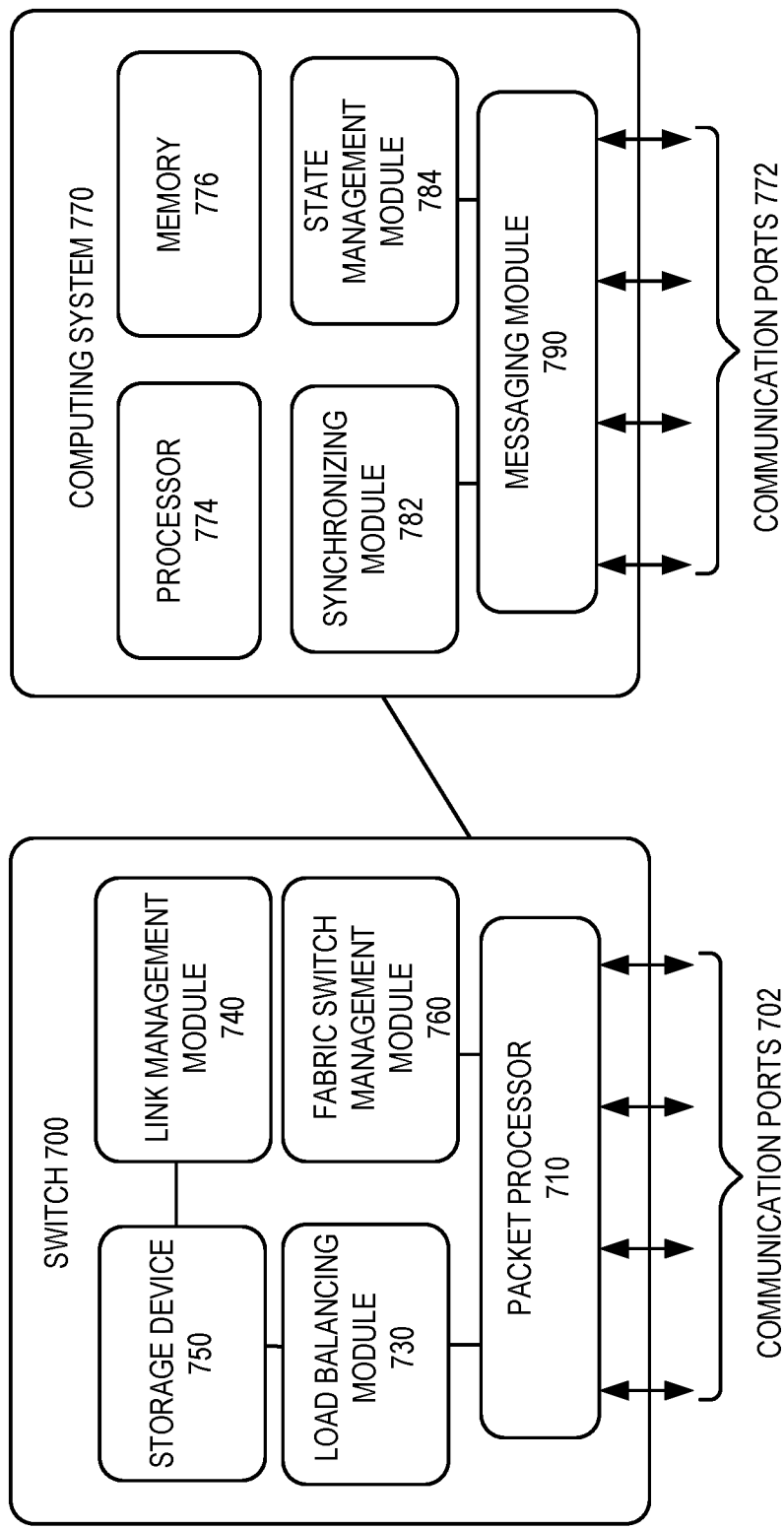
FIG. 7 illustrates an exemplary architecture of a switch and a computing system capable of providing multicast load balancing support to a virtual link aggregation, in accordance with an embodiment of the present invention.

FIG. 7 illustrates an exemplary architecture of a switch and a computing system capable of providing multicast load balancing support to a virtual link aggregation, in accordance with an embodiment of the present invention. In this example, a switch 700 includes a number of communication ports 702, a load balancing module 730, a packet processor 710, a link management module 740, and a storage device 750. Packet processor 710 extracts and processes header information from the received frames.

In some embodiments, switch 700 may maintain a membership in a fabric switch, wherein switch 700 also includes a fabric switch management module 760. Fabric switch management module 760 maintains a configuration database in storage device 750 that maintains the configuration state of every switch within the fabric switch. Fabric switch management module 760 maintains the state of the fabric switch, which is used to join other switches. In some embodiments, switch 700 can be configured to operate in conjunction with a remote switch as a logical Ethernet switch. Under such a scenario, communication ports 702 can include inter-switch communication channels for communication within a fabric switch. This inter-switch communication channel can be implemented via a regular communication port and based on any open or proprietary format. Communication ports 702 can include one or more TRILL ports capable of receiving frames encapsulated in a TRILL header. Packet processor 710 can process these frames.

Link management module 740 operates at least one of communication ports 702 in conjunction with a remote switch to form a virtual link aggregation. During operation, load balancing module 730 generates an index of a weight distribution vector, which can be stored in storage device 750, based on address information of a multicast group associated with the virtual link aggregation. If the index indicates a slot corresponding to switch 700, load balancing module 730 allocates switch 700 as primary switch for the multicast group. In some embodiments, load balancing module 730 generates the index based on a hash value and number of slots of the weight distribution vector. The load balancing module generates the hash value based on the address information of a multicast group associated with the virtual link aggregation.

If switch 700 receives an instruction indicating a change event from a remote synchronizing node, load balancing module 730 rebalances multicast groups among the switches participating in the virtual link aggregation. Similarly, if switch 700 receives an instruction indicating a switching over event from the synchronizing node, load balancing module 730 initiates switching over to a new topology resulting from the change event based on the rebalancing.

In some embodiments, a computing system 770 is coupled to switch 700 via one or more physical/wireless links. Computing system 770 can operate as the synchronizing node. Computing system 770 includes a general purpose processor 774, a memory 776, a number of communication ports 772, a messaging module 790, a synchronizing module 782, and a state management module 784. Processor 704 executes instructions stored in memory 706 to provide instructions switch 700 for coordinating and serializing change events. Messaging module 790 incorporates the instructions in a message and sends the instructions to switch 700 via one or more of the communication ports 772.

During operation, state management module 784 detects a change event associated with the virtual link aggregation. Synchronization module 782 generates a first instruction indicating the change event for switch 700, which participates in the virtual link aggregation. When computing system 770 receives acknowledgement for the first instruction from a respective switch participating in the virtual link aggregation, synchronization module 782 generates a second instruction for switching over to a new topology resulting from the change event for switch 700. Synchronization module 782 precludes computing system 770 from generating an instruction indicating a second change event until receiving acknowledgement for the second instruction from a respective switch participating in the virtual link aggregation.

Note that the above-mentioned modules can be implemented in hardware as well as in software. In one embodiment, these modules can be embodied in computer-executable instructions stored in a memory which is coupled to one or more processors in switch 700 and computing system 770. When executed, these instructions cause the processor(s) to perform the aforementioned functions.

In summary, embodiments of the present invention provide a switch, a method and a system for multicast load balancing in a virtual link aggregation. In one embodiment, the switch comprises one or more ports, a link management module and a load balancing module. The link management module operates a port of the one or more ports of the switch in conjunction with a remote switch to form a virtual link aggregation. The load balancing module generates an index of a weight distribution vector based on address information of a multicast group associated with the virtual link aggregation. A slot of the weight distribution vector corresponds to a respective switch participating in the virtual link aggregation. In response to the index indicating a slot corresponding to the switch, the load balancing module designates the switch as primary switch for the multicast group, which is responsible for forwarding multicast data of the multicast group via the virtual link aggregation.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   a link management module operable to operate a port of the one or more ports of the switch in conjunction with a remote switch to form a virtual link aggregation; and
   a load balancing module operable to:
   generate an index of a weight distribution vector based on address information of a multicast group associated with the virtual link aggregation, wherein a slot of the weight distribution vector corresponds to a respective switch participating in the virtual link aggregation; and a number of slots indicates a bandwidth ratio or number of links in the virtual link aggregation; and
   in response to the index indicating a slot corresponding to the switch, designate the switch as a primary switch for the multicast group, which is responsible for forwarding multicast data of the multicast group via the virtual link aggregation.

2. The switch of claim 1, wherein slots of the weight distribution vector are ordered based on switch identifiers of switches participating in the virtual link aggregation.

3. The switch of claim 1, wherein the load balancing module is further operable to generate the index based on a hash value and a number of slots of the weight distribution vector, wherein the hash value is based on the address information of a multicast group associated with the virtual link aggregation.

4. The switch of claim 1, wherein the load balancing module is further operable to rebalance multicast groups among switches participating in the virtual link aggregation in response to receiving an instruction indicating a change event from a remote synchronizing node.

5. The switch of claim 4, wherein the rebalancing of multicast groups is based on one or more of: a no-rebalancing mode; a partial-rebalancing mode; and a full-rebalancing mode.

6. The switch of claim 4, wherein the load balancing module is further operable to initiate switching over to a new topology resulting from the change event based on the rebalancing in response to receiving an instruction indicating a switching over event from the synchronizing node.

7. The switch of claim 1, wherein the switch and the remote switch are members of an Ethernet fabric switch; and wherein the switch and the remote switch are associated with an identifier of the Ethernet fabric switch.

8. A method, comprising:
   operating a port of a switch in conjunction with a remote switch to form a virtual link aggregation;
   generating an index of a weight distribution vector based on address information of a multicast group associated with the virtual link aggregation, wherein a slot of the weight distribution vector corresponds to a respective switch participating in the virtual link aggregation and a number of slots indicates a bandwidth ratio or number of links in the virtual link aggregation; and
   in response to the index indicating a slot corresponding to the switch, designating the switch as a primary switch for the multicast group, which is responsible for forwarding multicast data of the multicast group via the virtual link aggregation.

9. The method of claim 8, further comprising ordering slots of the weight distribution vector based on switch identifiers of switches participating in the virtual link aggregation.

10. The method of claim 8, further comprising generating the index based on a hash value and a number of slots of the weight distribution vector, wherein the hash value is based on the address information of a multicast group associated with the virtual link aggregation.

11. The method of claim 8, further comprising rebalancing multicast groups among switches participating in the virtual link aggregation in response to receiving an instruction indicating a change event from a remote synchronizing node.

12. The method of claim 11, wherein the rebalancing of multicast groups is based on one or more of: a no-rebalancing mode; a partial-rebalancing mode; and a full-rebalancing mode.

13. The method of claim 11, further comprising initiating switching over to a new topology resulting from the change event based on the rebalancing in response to receiving an instruction indicating a switching over event from the synchronizing node.

14. The method of claim 8, wherein the switch and the remote switch are members of an Ethernet fabric switch; and wherein the switch and the remote switch are associated with an identifier of the Ethernet fabric switch.

* * * * *